April 17, 1951  V. V. MASON  2,549,698
ENGINE OIL FILTER
Filed May 6, 1950
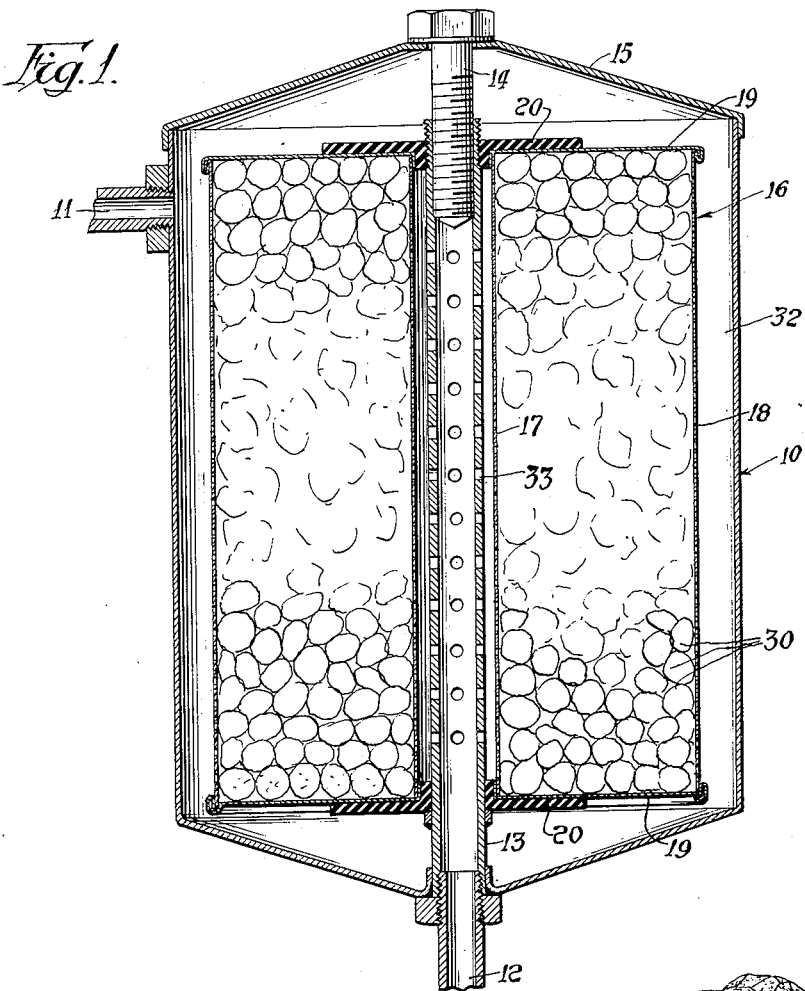
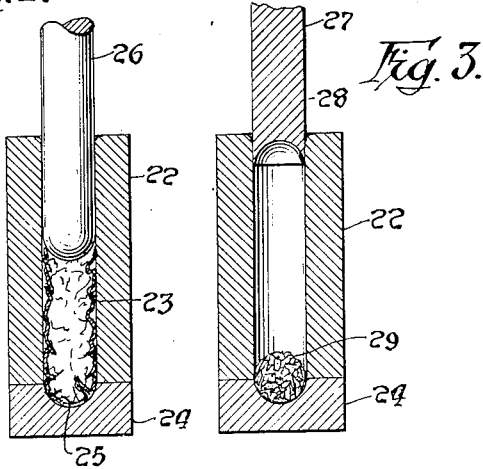
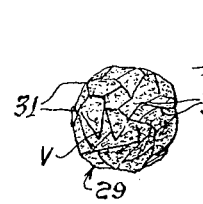
INVENTOR.
Veyne V. Mason,
BY
Attorney.

Patented Apr. 17, 1951

2,549,698

UNITED STATES PATENT OFFICE 2,549,698

ENGINE OIL FILTER

Veyne V. Mason, Los Angeles, Calif.

Application May 6, 1950, Serial No. 160,414

4 Claims. (Cl. 210—131)

1

This invention has to do with improvements in lubricating oil filters, particularly of the type used as an internal combustion engine oil filter and containing a replaceable filter element within a container or body through which a continuous circulation of the oil is maintained during operation of the engine.

In its more particular aspects, the invention is directed to a novel type and form of filtering medium characterized functionally in that its filtering effect and efficiency result apparently from the creation of differential electrostatic charge conditions, and the utilization thereof to effect removal of dirt and carbonaceous impurities from the oil.

To those familiar with the problems of engine lubricating oil filtration, the difficulties of removing the most finely divided dirts and carbons are well known. Particularly troublesome is the soot-forming carbon generally found in oils, particularly diesel engine lubricating oils, after any extended period of engine operation. The general experience has been that these soot-like and colloidal carbons will not be fully retained by mechanical filtration on even the most finely porous of practicably usable filter media or materials, and that the effectiveness of the best of such filters is dependent upon frequent replacement of the filter element in some types, or upon the accumulation of separated solids which themselves function to a major degree as the filtering medium, but with limited efficiency.

The invention is distinguished from the conventional filters in that, as indicated, its performance results apparently from causing the surfaces of the filter medium, and the carbon and dirt particles to be removed, to have opposite electrical charges resulting in attraction of the dirt and carbon on to the filter medium and into recesses and pockets contained therein. This belief of filtration by induced opposite electrical charges follows from the fact that while the filter medium lacks the present extremely fine pore sizes of many materials found to have but limited efficiency in recovering fine carbon from oil passed through them, I have been able to separate virtually all fine solid particles under conditions of their apparent attraction to the surface irregularities of the present paper filter medium, and without passage of any major part of the oil through the paper itself.

In accordance with the invention I form the filter element proper of a suitable oil-passing receptacle containing a compacted mass of crumpled paper which in its crumpled form presents a large multiplicity of sharply defined folded

2 and free edges of the paper, as well as point-like intersections of the edges, all in random arrangement. Specificially the crumpled paper has the form of individual pellets which have been found to be most efficient when made in a generally ball-like or spherical form. When the pellets are contained within and electrically insulated from the outer filter body or shell, their surface irregularities appear to develop such electrostatic relation to the charges carried by the dirt and carbon particles as to attract the latter to the paper surfaces, and cause the dirt to accumulate within its folds without becoming reentrained in the oil.

The above mentioned features and objects of the invention, as well as additional objects and the details of an illustrative embodiment, will be developed in the following detailed description of the accompanying drawing, in which:

Fig. 1 is a view showing the filter in axial sectional plane;

Figs. 2 and 3 are views illustrating the die formation of an individual paper pellet; and Fig 4 is a view illustrating generally the surface irregularities of a generally sperical pellet.

It is to be understood that the invention contemplates utilization of the crumpled paper or compacted pellet mass in an engine oil filter of any suitable type and construction. Generally it is preferred to contain a compacted mass of the pellets within a replaceable filter element or cartridge removably contained within a body or shell connected into the oil circulation system.

As illustrative, the filter assembly is shown to comprise a shell 10, an inlet 11 and an outlet 12, the shell containing an axial tube 13 into the upper end of which is threaded a screw 14 which holds the cover 15 to the shell. The filter unit, generally indicated at 16, comprises a receptacle which may take the form of a metal container having preforated inner and outer cylindrical walls 17 and 18 with crimped-over end closures 19. The receptacle is supported in spaced relation from the shell 10 and is electrically insulated from the tube 13 as by the non-conductive gaskets 20.

The filter unit receptacle is packed with a mass of crumpled paper preferably in the form of individual pellets. In referring to the paper as being crumpled, it is desired to distinguish clearly between paper that is crumpled or crushed in a manner and to a degree which transforms the sheet into a body which assumes the general shape of a solid geometrical body by reason of the paper being creased and folded on or about itself, as contrasted with paper converted to other forms, such as a shredded condition.

Whereas the latter is ineffective with respect to the retention of subcolloidal carbons and dirts, the paper in the crumpled form contemplated by the invention is highly effective in removing such foreign particles. I further distinguish the present filter medium from others employing a paper or fabric in a condition such that the oil is caused to pass through the filter or fabric. The present filter medium functions in a manner such that the oil does not pass through the crumpled paper sheets themselves, but instead, only past and in contact with the folded and irregularized surfaces.

It is contemplated that the paper may be crumpled into pellets of any suitable shape. Tests have indicated that best results are obtainable using pellets in a generally ball-like or spherical form, apparently by reason of the more uniform surface exposition presented by pellets so shaped, to the oil flowing through the mass. Tests also indicate that best results are obtainable using a quality of paper having an unfinished or essentially unglazed surface. Preferably, therefore, the pellets are formed of newsprint paper or 100% ground unglazed paper stock of about newspaper weight. In this connection, a practical advantage of the invention is that the pellets may be made of printed newspaper available at very low cost.

Figs. 2 and 3 are illustrative of one method of forming the individual pellets using a die one section 22 of which has a cylindrical bore 23 the bottom section 24 of the die having a hemispherical recess 25 alined with the bore sleeve. A piece of newspaper of about 4½ to 5 inches square first is thrust down into the bottom of the die by plunger 26, following withdrawal of which the paper is crumpled into the die bore so as to be engageable by a second plunger 27 having in its head a hemispherical cavity 28. Downward movement of plunger 27 crumples the paper into a generally spherical form pellet 29 as shown in Figs. 3 and 4. Thus crumpled, the surface configuration of the pellet presents a large number of folded and free edges 30 all in random arrangement, with point-like irregularities at 31 where the edges intercept. Between the points and edges the folds form recesses or voids V within which the separated solids collect on the void-defining surfaces of the paper. Thus considering the volume of an individual pellet in its crumpled form, the pellet presents a large paper surface area for accumulation of impurities out of the oil.

When filled into the receptacle 18, the pellets 29 may be compressed somewhat to form a fairly compact mass retained between the crimped-over ends 19 of the receptacle. Oil fed through the inlet 11 enters the space 32 between the filter element and shell, and flows uniformly through the perforated receptacle and paper filter medium into the draw off tube 13 through its apertures 33. By reason of the composition and crumpled form of the paper, the filtered oil reaching the outlet 12 will be found substantially free of the smallest as well as larger size dirt and carbon particles. Upon inspection, these will be found to accumulate in the cavities and recesses within the pellets, and by reason of the accumulated capacities of such spaces, a single filter unit will be found capable of efficient use over an extended period of time.

Good results have been obtained using crumpled paper pellets of various sizes, and particularly within the range of about ¼ to 1 inch in diameter. By crumpling typically a 5 inch square paper sheet, the resulting pellet in a free state will have a diameter of roughly ¾ inch.

I claim:

1. An oil filter element capable of removing colloidally suspended particles in oil being filtered, comprising a receptacle containing an oil-passing compacted mass of pellets each having a dimension through the pellet of at least about one-quarter inch and being formed of newsprint paper crumpled to present sharply defined outer folded edges and oil penetrable voids formed by the paper folds and extending deeply into the pellet between said edges and between the intercontacting surfaces of the pellets, the oil being filtered passing over and in contact with the surfaces of the paper and carbonaceous particles being depositable from the oil on opposite surfaces of the paper within the voids.

2. An oil filter element as defined in claim 1, having a generally cylindrical receptacle containing apertures through which the oil flows transversely of the receptacle axis into the pellet mass.

3. An oil filter element capable of removing colloidally suspended particles in oil being filtered comprising a receptacle containing an oil-passing compacted mass of pellets each formed of a single sheet of newsprint paper having a surface attraction for the particles, said attractive surface being formed by having the paper crumpled initially into generally ball-shaped form within the size range of about one-quarter to one inch in diameter, each pellet having outer folded edges and oil penetrable voids formed by the paper folds and extending into the pellet between said edges, the oil being filtered passing over and in contact with the surfaces of the paper and carbonaceous particles being deposited from the oil on opposite surfaces of the paper within the voids.

4. An oil filter comprising a body shell having an inlet and an outlet, a replaceable apertured metallic receptacle within said shell, means electrically insulating said receptacle from the shell, and a compacted mass of pellets capable of removing colloidally suspended particles in oil being filtered in said receptacle, said pellets each being formed of a single sheet of paper having a surface attraction for the particles, said attractive surface being formed by having the paper crumpled initially into generally ball-shaped form within the size range of about ¼ to 1 inch in diameter, each pellet having outer folded edges and oil penetrable voids formed by the paper folds and extending into the pellet between said edges, the oil being filtered passing over and in contact with the surfaces of the paper.

VEYNE V. MASON.

REFERENCES CITED

The following references are of record in the file of this patent:

UNITED STATES PATENTS

| Number | Name | Date |
| --- | --- | --- |
| 1,201,302 | Jayne | Oct. 17, 1916 |
| 1,412,790 | Uehling | Apr. 11, 1922 |
| 2,116,537 | Miller | May 10, 1938 |
| 2,181,608 | Russell et al. | Nov. 28, 1939 |
| 2,209,180 | Von Pentz | July 23, 1940 |
| 2,369,857 | Russell et al. | Feb. 20, 1945 |

FOREIGN PATENTS

| Number | Country | Date |
| --- | --- | --- |
| 533,576 | Great Britain | Feb. 17, 1941 |